Aug. 24, 1926.  
H. F. HERMANSON  
DEMOUNTABLE AUTOMOBILE RIM  
Filed Oct. 30, 1925  
1,597,377
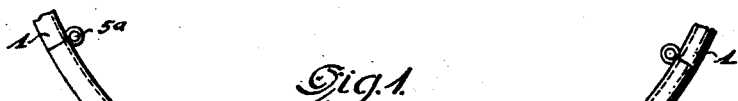
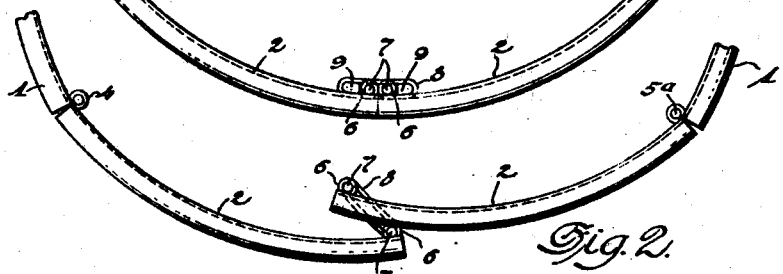
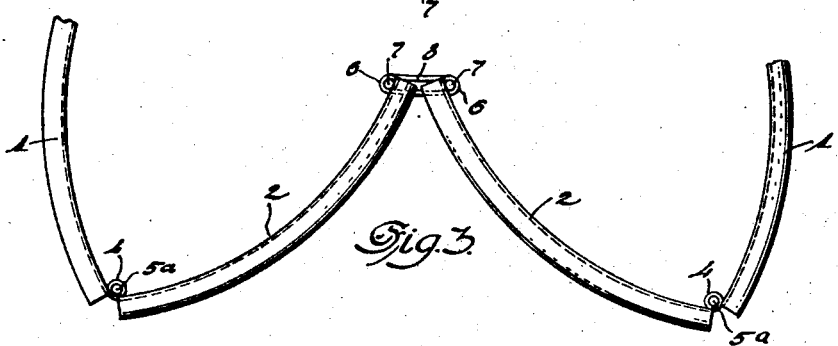
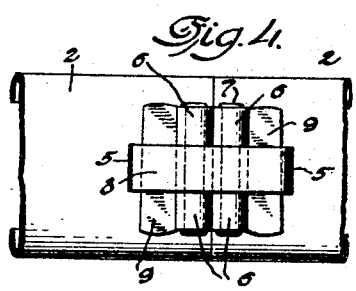
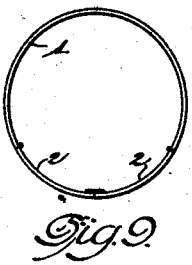
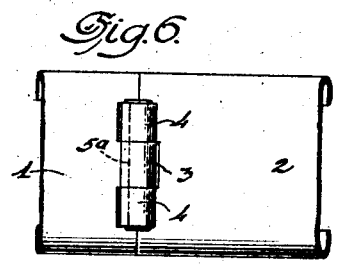
Inventor:  
Henry F. Hermanson  
By  
Attorney Patented Aug. 24, 1926.

1,597,377

UNITED STATES PATENT OFFICE.

HENRY F. HERMANSON, OF ST. CLAIR, MICHIGAN, ASSIGNOR OF ONE-HALF TO SYLVESTER T. PETOSKEY, OF DETROIT, MICHIGAN.

DEMOUNTABLE AUTOMOBILE RIM.

REISSUED

Application filed October 30, 1925. Serial No. 65,749.

This invention relates to a demountable automobile rim and the primary object of my invention is to provide a rim with sections that may be collapsed inwardly to permit of an outer tire casing or tire being easily and quickly removed from the rim.

Another object of my invention is to provide positive and reliable means, in a manner as hereinafter set forth, for connecting together inwardly swingable rim sections, so as to retain the sections in proximity to each other when collapsed, and also retain the sections rigid when in distended positions forming part of a rim.

A further object of this invention is to provide a linkage connection for parts which linkage connection may be rigid to hold the parts in alinement with each other.

The above and other objects are attained by a novel construction that will be hereinafter specifically described and then claimed, and reference will now be had to the drawing, wherein—

Figure 1 is a side elevation of a portion of a demountable rim in accordance with this invention;

Fig. 2 is a similar view showing a rim partly collapsed;

Fig. 3 is a similar view showing the rim completely collapsed;

Fig. 4 is a view of the inner wall of the rim showing the linkage connection;

Fig. 5 is a side elevation of the same;

Fig. 6 is a view of the inner wall of the rim showing a hinge connection;

Fig. 7 is a side elevation of the same;

Fig. 8 is a cross sectional view of one of the rim connections, and

Fig. 9 is an elevation of a complete distended rim.

In the drawing, the reference numeral 1 denotes the main section of a tire supporting rim, and 2 denotes collapsible sections which cooperate with the main section in completing the rim, said sections being channel shaped with side flanges adapted for holding the clencher edges of an outer tire casing or various types of tires.

The main section 1 has its ends formed with single barrels 3 adapted to extend between sets of barrels formed on the ends of the collapsible sections 2, and pivot pins 5ª are adapted to extend through the barrels 3 and 4 to hingedly connect the sections 2 to the ends of the section 1.

The confronting ends of the collapsible sections 2 are longitudinally slotted, as at 5, and each end provided with a set of transversely alining barrels 6 having pins 7 mounted therein.

Loose on the pins 7 is an oblong comparatively flat or arcuated link 8 adapted to engage in the slots 5 in the confronting ends of the sections 2, said link connecting the ends of the sections 2 so that the same are held against extreme movement or accidental displacement.

9 denotes wedges, tapered pins, keys or the like adapted to be placed in the ends of the link 8 against the barrels 6 so as to take up any lost motion of the link relative to said barrels and said pins. In other words, the wedges 9 substantially fill the link and by reason of there being two of the pins 7 the link is maintained in a plane parallel to the end portions of the sections 2 and prevented from turning about on the pins. With the ends of the wedges 9 overlying the end portions of the sections 2 there is practically a rigid connection between the sections 2 when the wedges are in place, thus maintaining the sections 2 as a circumferential continuation of the main section 1, as shown in Figs. 1 and 9.

By removing the wedges 9 the sections 2 can be swung inwardly, first one and then the other, until said sections are in a collapsed position, as shown in Fig. 3, such permitting of a tire being easily removed from the main section 1 of the rim. Removal of the wedges 9 permits the link to freely shift on the pins 7 and between the barrels of each set and it is in consequence of this loose articulation that the collapsible sections 2 can be manipulated to provide a sufficient gap between the ends of the main section 1 for easy removal of a tire casing from the main rim section 1.

It is obvious that when the demountable rim is mounted on a felloe or the fixed rim of a wheel that the felloe or fixed rim will be cut away or recessed to provide clearance for the hinges and linkage of the rim sections.

One embodiment of my invention has been illustrated, but it is to be understood that the structural elements are susceptible to such variations and modifications as fall within the scope of the appended claims.

What I claim is:—

1. A tire rim having hinged collapsible sections, a link loosely connecting the ends of the collapsible rim sections together, and means adapted to be inserted in said link to cooperate therewith in establishing a rigid connection between the collapsible rim sections.

2. A rim as called for in claim 1, wherein said means is in the form of wedges adapted to be inserted in the end portions of said link.

3. A rim comprising a main section, collapsible sections hinged to the ends of the said main section, a link loosely connecting together the ends of said collapsible sections, and means adapted to extend through the end portions of said link and engage said collapsible sections for establishing a rigid connection between said collapsible sections.

4. A rim comprising a main section, collapsible sections hinged to the ends of said main section, pins carried by the free ends of said collapsible sections, a link loosely connecting said pins, and means adapted to be placed in the ends of said links to establish a rigid connection between said collapsible sections.

5. A rim having collapsible sections, barrels carried by said collapsible sections, a link loosely articulated relative to said barrels and wedges adapted to extend through said link against said barrels and establish a rigid connection between said collapsible rim sections.

6. A rim having collapsible sections, barrels carried by said collapsible sections, pins in said barrels, a link loose on said pins and adapted to extend into said collapsible sections, and wedges adapted to be mounted in the end portions of said link and against said barrels and said collapsible rim sections to establish a rigid connection between said collapsible rim sections.

In testimony whereof I affix my signature.

HENRY F. HERMANSON.